US010972036B2

(12) United States Patent
Sakai et al.

(10) Patent No.: US 10,972,036 B2
(45) Date of Patent: Apr. 6, 2021

(54) DEVICE AND METHOD FOR CONTROLLING LINEAR ACTUATOR

(71) Applicant: THK CO., LTD., Tokyo (JP)

(72) Inventors: Junichi Sakai, Tokyo (JP); Shuhei Yamanaka, Tokyo (JP); Hideo Saito, Tokyo (JP); Yuki Nomura, Tokyo (JP); Hideya Nakayama, Tokyo (JP)

(73) Assignee: THK CO., LTD., Tokyo (JP)

( * ) Notice: Subject to any disclaimer, the term of this patent is extended or adjusted under 35 U.S.C. 154(b) by 313 days.

(21) Appl. No.: 15/746,906

(22) PCT Filed: Jul. 27, 2016

(86) PCT No.: PCT/JP2016/072013
§ 371 (c)(1),
(2) Date: Jan. 23, 2018

(87) PCT Pub. No.: WO2017/022588
PCT Pub. Date: Feb. 9, 2017

(65) Prior Publication Data
US 2020/0091851 A1 Mar. 19, 2020

(30) Foreign Application Priority Data

Aug. 4, 2015 (JP) .............................. JP2015-153850

(51) Int. Cl.
*H02P 25/064* (2016.01)
*F16D 63/00* (2006.01)
(Continued)

(52) U.S. Cl.
CPC .......... *H02P 25/064* (2016.02); *F16D 63/008* (2013.01); *F16D 65/14* (2013.01);
(Continued)

(58) Field of Classification Search
CPC .......... F16D 63/008; F16D 65/14; H02P 3/26; H02P 25/064
See application file for complete search history.

(56) References Cited

U.S. PATENT DOCUMENTS 6,445,154 B1 * 9/2002 Toyozawa ................. H02P 6/18
318/700
7,309,972 B2 * 12/2007 Kranitzky ................. H02P 6/16
318/661

(Continued)

FOREIGN PATENT DOCUMENTS

CN 101764556 A 6/2010
CN 102545738 A 7/2012
(Continued)

OTHER PUBLICATIONS

International Search Report dated Oct. 4, 2016, issued in counterpart International Application No. PCT/JP2016/072013, w/English translation (4 pages).

(Continued)

*Primary Examiner* — Said Bouziane
(74) *Attorney, Agent, or Firm* — Westerman, Hattori, Daniels & Adrian, LLP

(57) ABSTRACT

A control device for controlling a linear actuator having a linear motor and a brake device includes a magnetic pole position estimation means to estimate which of a plurality of sections obtained by dividing a magnetic pole position of 0° to 360°, the mover is located in on the basis of a direction of movement of the mover by pulse energization, a magnetic pole position setting means to perform direct current excitation at an estimated magnetic pole position estimated by the magnetic pole position estimation means and set the estimated magnetic pole position as a magnetic pole position of the mover, and a brake control means to turn on a brake device before pulse energization by the magnetic pole posi- (Continued)

tion estimation means is performed and turn off the brake device after the magnetic pole position estimation means estimates the section in which the mover is located.

5 Claims, 13 Drawing Sheets

(51) Int. Cl.
*F16D 65/14* (2006.01)
*H02P 3/26* (2006.01)
*F16D 121/22* (2012.01)
*F16D 125/58* (2012.01)

(52) U.S. Cl.
CPC ............ *H02P 3/26* (2013.01); *F16D 2121/22* (2013.01); *F16D 2125/587* (2013.01)

(56) References Cited

U.S. PATENT DOCUMENTS

| 2006/0043921 | A1 | 3/2006 | Nagura et al. |
| 2015/0069941 | A1* | 3/2015 | Iwaji ................ H02P 6/18 318/400.11 |
| 2016/0226417 | A1 | 8/2016 | Nomura et al. |
| 2017/0047876 | A1* | 2/2017 | Lee ..................... H02J 50/10 |
| 2018/0205330 | A1* | 7/2018 | Tokairin ................ H02P 6/17 |

FOREIGN PATENT DOCUMENTS

| CN | 103378774 A | | 10/2013 |
| JP | 5-15179 A | | 1/1993 |
| JP | 2002287005 A | * | 10/2002 |
| JP | 2006-67749 A | | 3/2006 |
| JP | 2006-136200 A | | 5/2006 |
| TW | 201334393 A | | 8/2013 |
| WO | 2015/037423 A1 | | 3/2015 |

OTHER PUBLICATIONS

Office Action dated Nov. 6, 2019, issued in counterpart TW Application No. 105124347, with Partial English translation. (6 pages).

Office Action dated Nov. 27, 2019, issued in counterpart CN Application No. 201680044796.8, with Partial English translation. (8 pages).

Notice of Allowance dated Jul. 22, 2020, issued in counterpart CN Application No. 201680044796.8, with Partial translation. (7 pages).

* cited by examiner

DEVICE AND METHOD FOR CONTROLLING LINEAR ACTUATOR

TECHNICAL FIELD

The present invention relates to a device and method for controlling a linear actuator. Priority is claimed on Japanese Patent Application No. 2015-153850, filed Aug. 4, 2015, the content of which is incorporated herein by reference.

BACKGROUND ART

A linear motor used for a linear actuator or the like cannot generate a thrust according to the thrust constant of the linear motor unless energization is performed according to a relative positional relationship (a magnetic pole position) between a plurality of coils provided on one of a mover or a stator and a driving magnet provided on the other. Therefore, when driving of the linear motor starts, it is necessary to determine the relative position of the mover with respect to the stator. For example, when driving of the linear motor starts, the mover is pulled to the magnetic pole position (i.e., DC excitation is performed) by applying a current corresponding to a predetermined magnetic pole position to the linear motor for a certain period of time (Patent Literature 1).

CITATION LIST

Patent Literature

[Patent Literature 1]
Japanese Unexamined Patent Application, First Publication No. Hei 5-15179

SUMMARY OF INVENTION

Technical Problem

However, when the mover is located at a magnetic pole position shifted by 180° from the predetermined magnetic pole position, the mover cannot be pulled even if the above-described DC excitation is performed and the position of the mover sometimes cannot be determined correctly. Further, when an external force such as gravity acts on the mover in the case in which the linear motor is installed such that the linear motor is driven in the vertical direction, the mover cannot be pulled to the predetermined magnetic pole position and the position of the mover cannot be determined correctly depending on the difference in magnitude between the pulling force by DC excitation and the external force.

The present invention has been made in view of the above problems and it is an object of the present invention to provide a control device and method for a linear actuator which can improve the accuracy of detection of a magnetic pole position in a linear motor used for the linear actuator or the like.

Solution to Problem

A control device for a linear actuator according to a first aspect of the present invention to solve the above problems is a control device for a linear actuator having a linear motor and a brake device configured to brake a mover of the linear motor includes a magnetic pole position estimation means that is configured to estimate which of a plurality of sections obtained by dividing a magnetic pole position of 0 to 360° the mover is located in on the basis of a direction of movement of the mover by pulse energization, a magnetic pole position setting means that is configured to perform direct current excitation at an estimated magnetic pole position based on the section in which the mover is located estimated by the magnetic pole position estimation means and set the estimated magnetic pole position as a magnetic pole position of the mover, and a brake control means that is configured to turn on the brake device before pulse energization by the magnetic pole position estimation means is performed and turn off the brake device after the magnetic pole position estimation means estimates the section in which the mover is located.

According to a second aspect of the present invention, in the control device for the linear actuator according to the first aspect, the magnetic pole position estimation means may be configured to estimate the section in which the mover is located on the basis of a direction in which the mover has moved in each of first and second consecutive pulse energization.

According to a third aspect of the present invention, in the control device according to the second aspect, when the brake device is in an on state, the brake device may be configured to brake a movement of the mover in a first direction in which the mover is movable and to not brake a movement thereof in a second direction opposite to the first direction, and the mover ma be configured to receive an external force in the first direction.

According to a fourth aspect of the present invention, in the control device according to the second aspect, the mover may be configured to receive an external force in one of a first direction in which the mover is movable and a second direction opposite to the first direction, and the brake device may be configured to apply braking to such an extent that the mover is not moved by the external force when the brake device is in an on state.

A control method according to a fifth aspect of the present invention is a control method for a control device to control a linear actuator having a linear motor and a brake device configured to brake a mover of the linear motor includes a first step including turning on the brake device, a second step including estimating which of a plurality of sections obtained by dividing a magnetic pole position of 0° to 360° the mover is located in on the basis of a direction of movement of the mover by pulse energization, a third step including turning off the brake device after the section in which the mover is located is estimated in the second step, and a fourth step including performing direct current excitation at an estimated magnetic pole position based on the section in which the mover is located estimated in the second step and setting the estimated magnetic pole position as a magnetic pole position of the mover.

Advantageous Effects of Invention

According to the above-described linear motor, it is possible to improve the accuracy of detection of the magnetic pole position in the linear motor.

DESCRIPTION OF EMBODIMENTS

Figure 1:
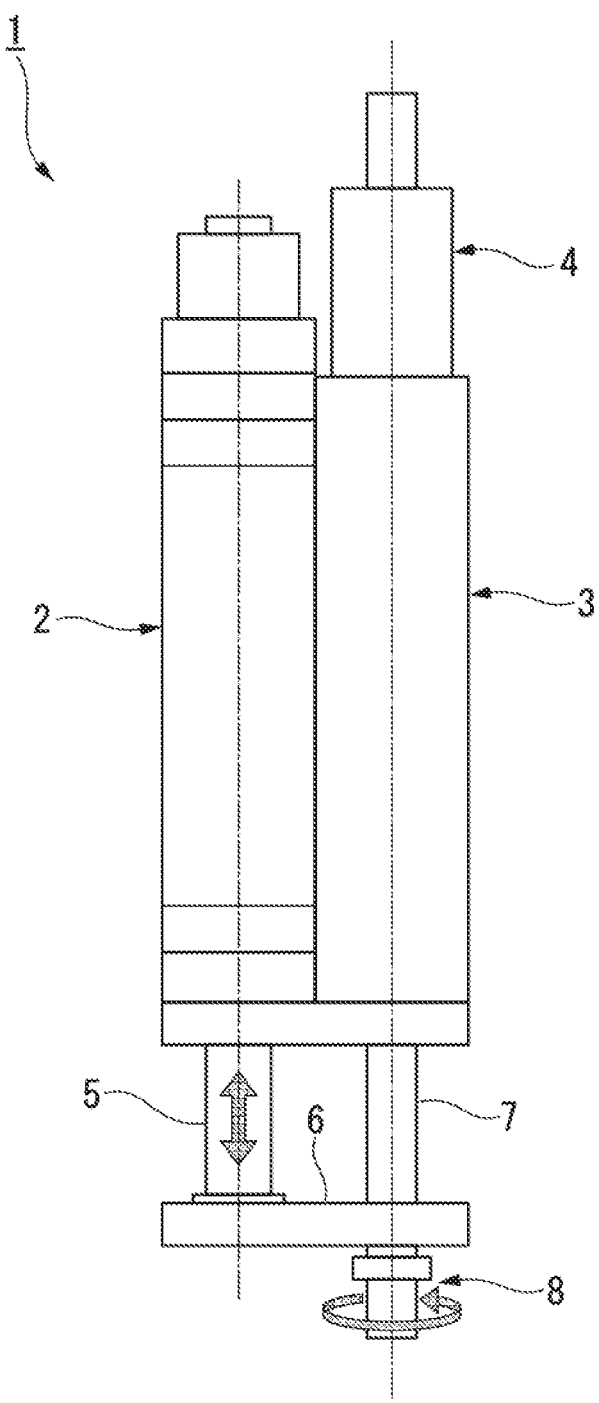
FIG. 1 is a configuration diagram showing a linear actuator according to the present embodiment.
Figure 7:
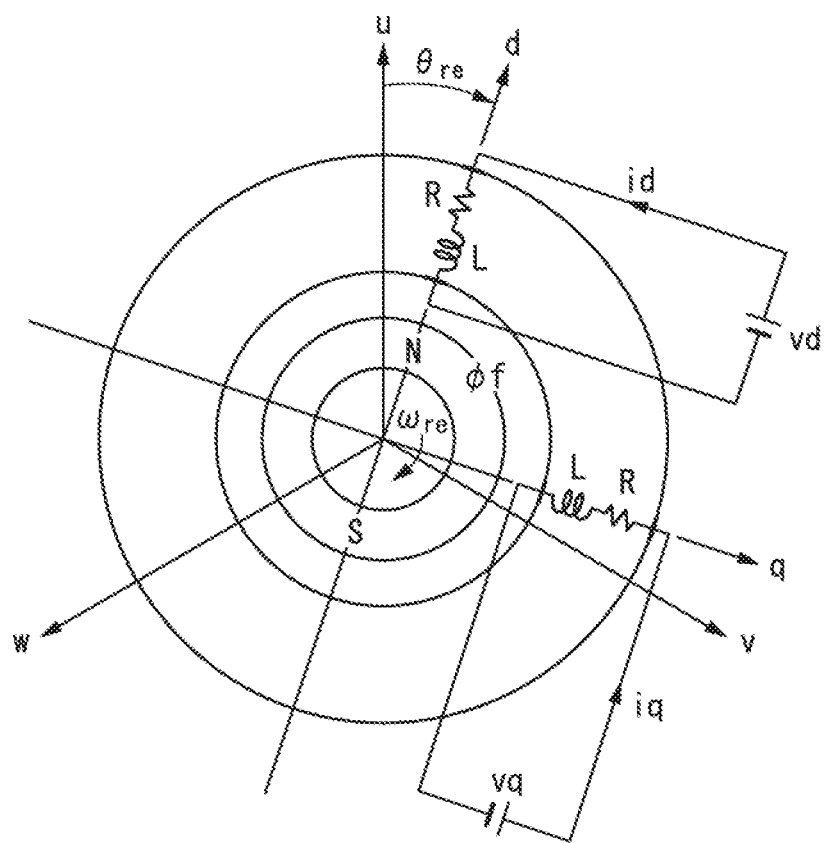
FIG. 7 is a diagram showing an equivalent circuit of a permanent magnet synchronous motor in a d-q coordinate system.

Hereinafter, a control device and method for a linear actuator in an embodiment according to the present invention will be described with reference to the drawings. FIG. 7 is a configuration diagram showing a linear actuator 1 according to the present embodiment. As shown in FIG. 1, the linear actuator 1 includes a linear motion device 2, a rotating device 3, and a brake device 4.

The linear motion device 2 is made of a linear motor and linearly moves a rod 5 which is a mover of the linear motor. A connecting plate 6 is fixed to a tip of the rod 5. On the other hand, the rotating device 3 is made of a rotary motor and rotates a rod 7 which is a mover. A tip of the rod 7 is rotatably connected to the connecting plate 6 via a bearing (not shown) provided on the connecting plate 6. This rod 7 is supported by a spline device (a linear guide device) (not shown) provided inside the rotating device 3 and is rotatably and linearly movable.

An attachment portion 8 to which an application device such as a tool and a suction pad is attached is provided at the tip of the rod 7. The attachment portion 8 is rotated about the center axis of the rod 7 by the rotating device 3. The attachment portion 8 is also moved in the axial direction along the center axis of the rod 7 by the linear motion device 2. That is, when the rod 5 is moved in the axial direction by the linear motion device 2, the rod 7 is moved in the axial direction together with the rod 5 by the connecting plate 6 and the axial position of the attachment portion 8 changes.

Figure 2:
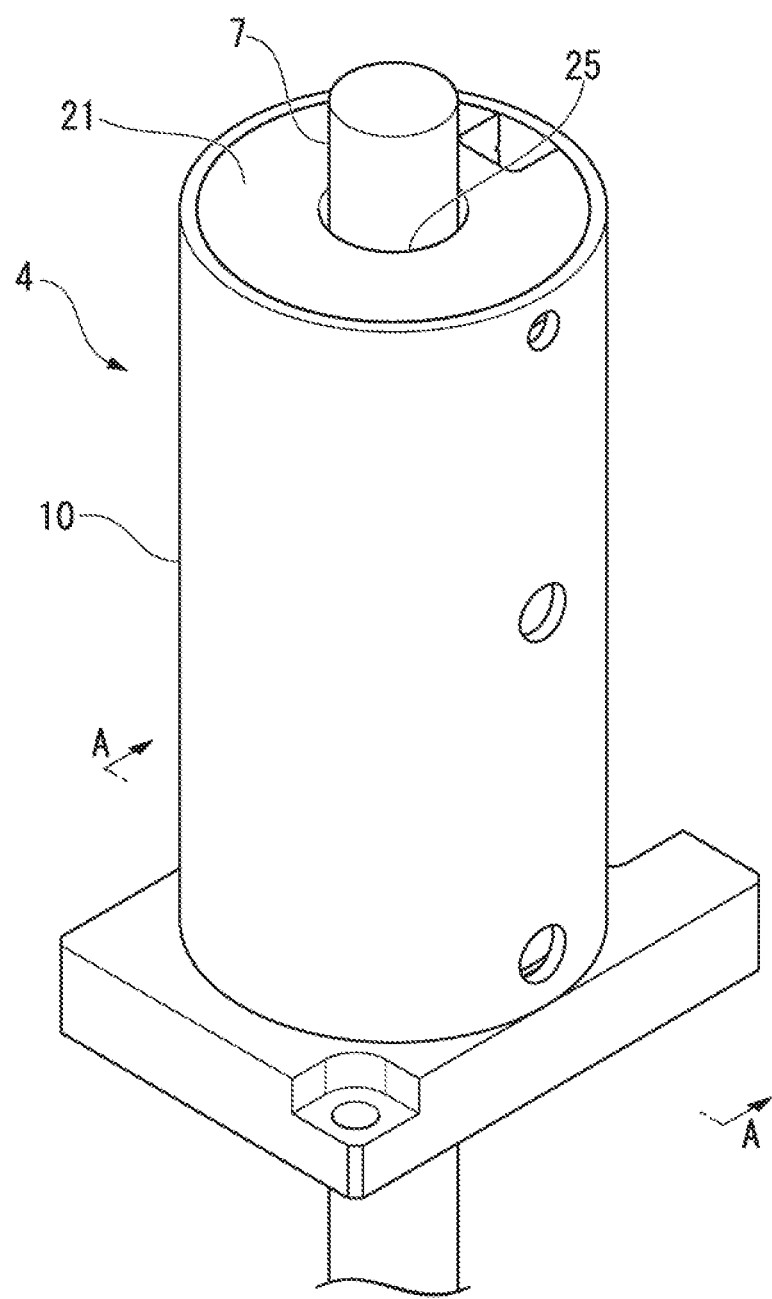
FIG. 2 is a perspective view showing a brake device according to the present embodiment.
Figure 3:
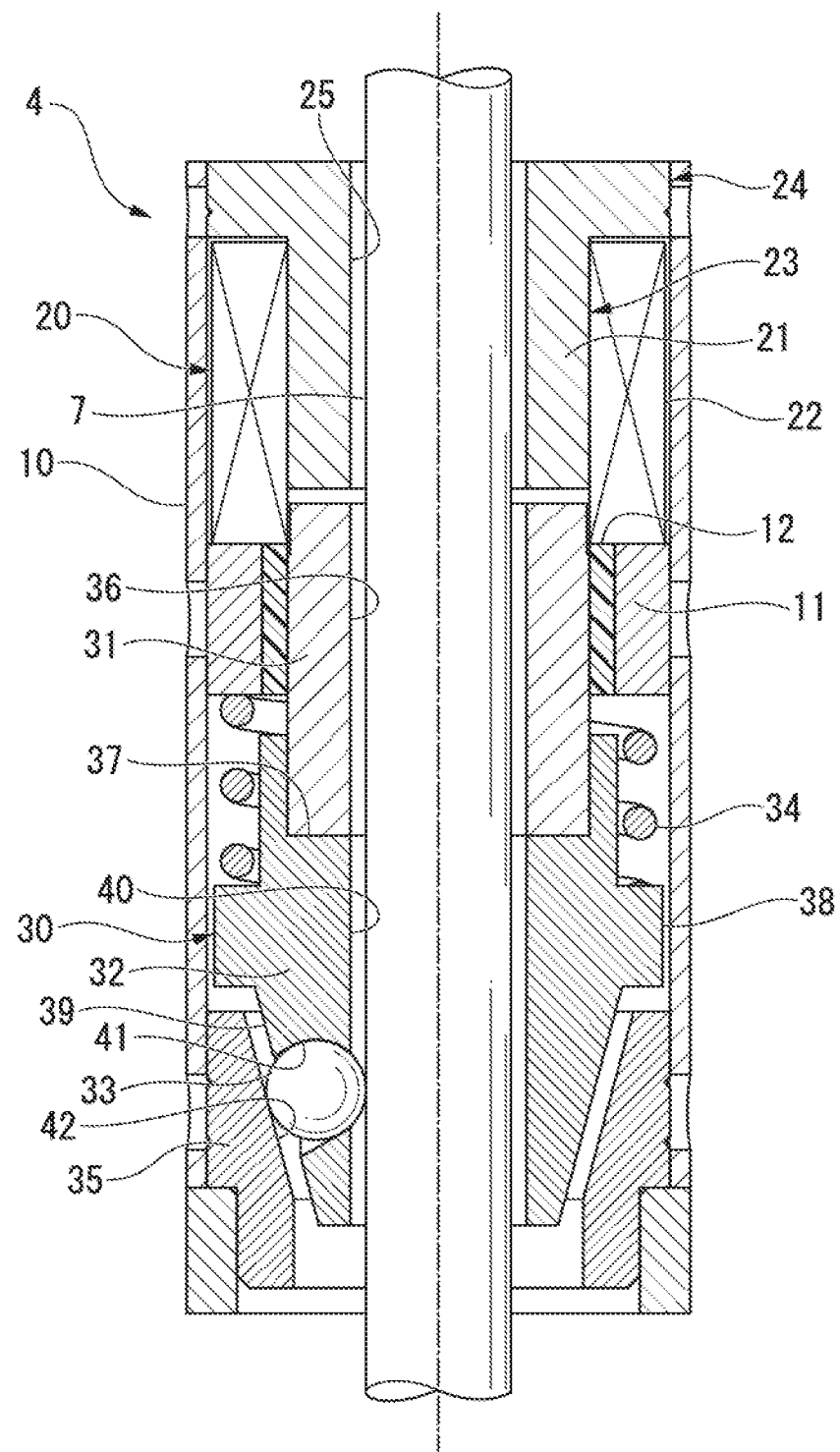
FIG. 3 is a sectional view taken along line A-A shown in FIG. 2.
Figure 4:
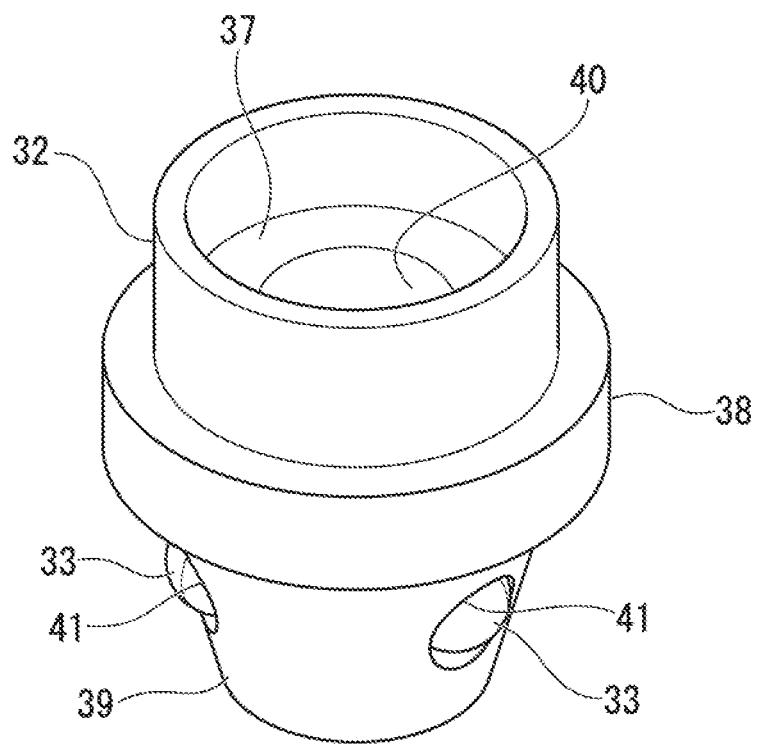
FIG. 4 is a perspective view showing a brake slider according to the present embodiment.

The brake device 4 decreases the movement speed of the rod 7 in the axial direction and also stops the movement of the rod 7 in the axial direction. The brake device 4 of the present embodiment is attached to the rotating device 3. In the present embodiment, the axial direction of the rod 7 coincides with the direction of gravity. FIG. 2 is a perspective view showing the brake device 4 according to the present embodiment. FIG. 3 is a sectional view taken along line A-A shown in FIG. 2. FIG. 4 is a perspective view showing a brake slider 32 in the present embodiment.

As shown in FIG. 2, the brake device 4 is formed in a cylindrical shape and the rod 7 is disposed to penetrate through the center thereof. As shown in FIG. 3, the brake device 4 includes a housing 10, a drive unit 20, and a brake mechanism 30. The housing 10 is formed in a cylindrical shape. The drive unit 20 and the brake mechanism 30 are housed in the housing 10. The drive unit 20 is made of a solenoid and has a fixed core 21 and a coil 22.

The fixed core 21 has a cylindrical portion 23 and a flange portion 24. The coil 22 is wound around the outer periphery of the cylindrical portion 23. The flange portion 24 is formed integrally with the cylindrical portion 23, radially expands from the cylindrical portion 23, and is fixed to one opening end portion of the housing 10. A through hole 25 in which the rod 7 is disposed is formed in the center of the fixed core 21. An annular member 11 facing the flange portion 24 in the axial direction of the rod 7 is fixed inside the housing 10. The coil 22 is disposed between the annular member 11 and the flange portion 24. A sliding bush 12 is fixed inside the annular member 11.

The brake mechanism 30 includes a movable core 31, a brake slider 32, balls 33, a compression spring 34, and a ball guide 35. The movable core 31 is formed in a cylindrical shape. The outer periphery of the n movable core 31 is supported by the sliding bush 12 such that the movable core 31 is movable in the axial direction of the rod 7. A through hole 36 in which the rod 7 is disposed is formed through the center of the movable core 31. The brake slider 32 has a fitting portion 37, a flange portion 38, and a ball holding portion 39.

The fitting portion 37 has a concave shape in which the movable core 31 can be press-fitted, and is engaged with the movable core 31 via an adhesive (not shown). This allows the movable core 31 and the brake slider 32 to move together in the axial direction of the rod 7. The flange portion 38 has a radially expanded flange shape. The flange portion 38 faces the annular member 11 in the axial direction of the rod 7. A compression spring 34 is disposed between the flange portion 38 and the annular member 11. The compression spring 34 biases the brake slider 32 away from the fixed core 21 of the drive unit 20.

A through hole 40 in which the rod 7 is disposed is formed through the center of the brake slider 32. The ball holding portion 39 has a conical shape with a tapered inclined surface in which ball holding holes 41 are formed. The inclined surface of the ball holding portion 39 and the through hole 40 communicate with each other in an oblique direction through the ball holding holes 41. As shown in FIG. 4, a plurality of ball holding holes 41 are formed in the ball holding portion 39. In the present embodiment, three ball holding holes are formed at equal intervals in the circumferential direction as the plurality of ball holding holes 41. The balls 33 are rotatably disposed in the plurality of ball holding holes 41.

As shown in FIG. 3, the balls 33 protrude radially outward from the inclined surface of the ball holding portion 39 such that they can contact the ball guide 35. The ball guide 35 is fixed to the other opening end portion of the housing 10. The ball guide 35 has a funnel shape with an inclined surface 42 that gradually decreases in diameter toward the tip of the brake slider 32. The inclined surface 42 faces the inclined surface of the ball holding portion 39 such that the balls 33 roll. The inclined surface 42 has a taper angle substantially equal to that of the inclined surface of the ball holding portion 39.

Figure 5A:
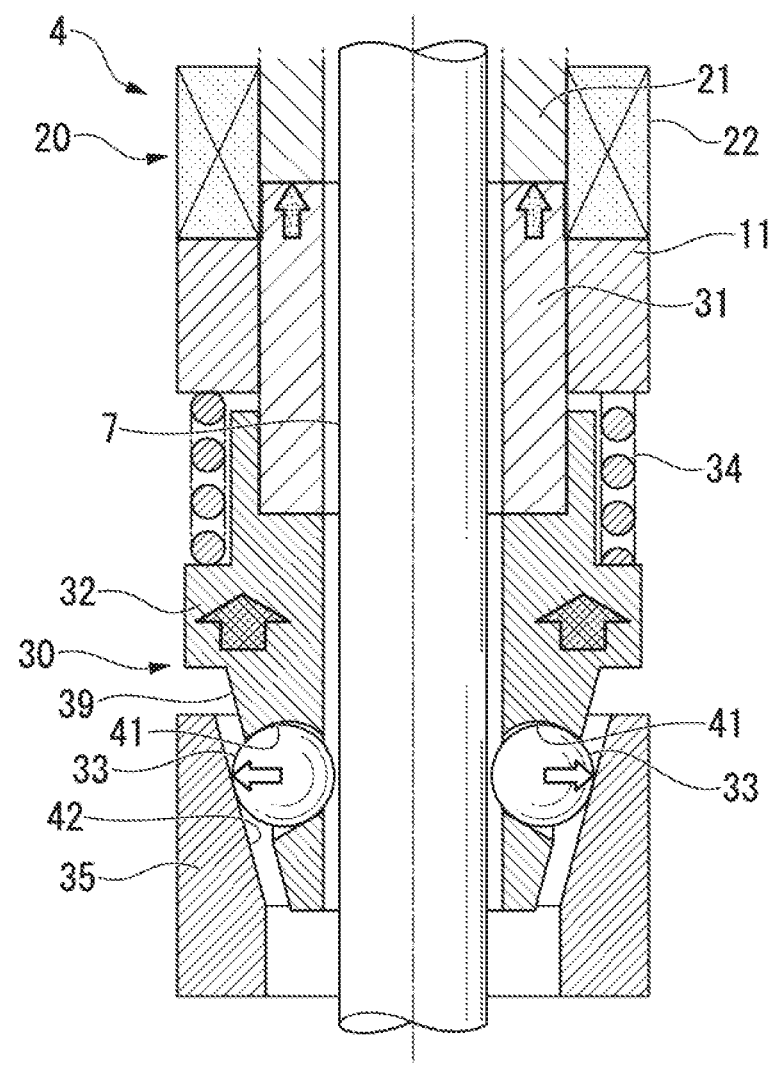
FIG. 5A is first diagram for explaining the operation of the brake device according to the present embodiment.
Figure 5B:
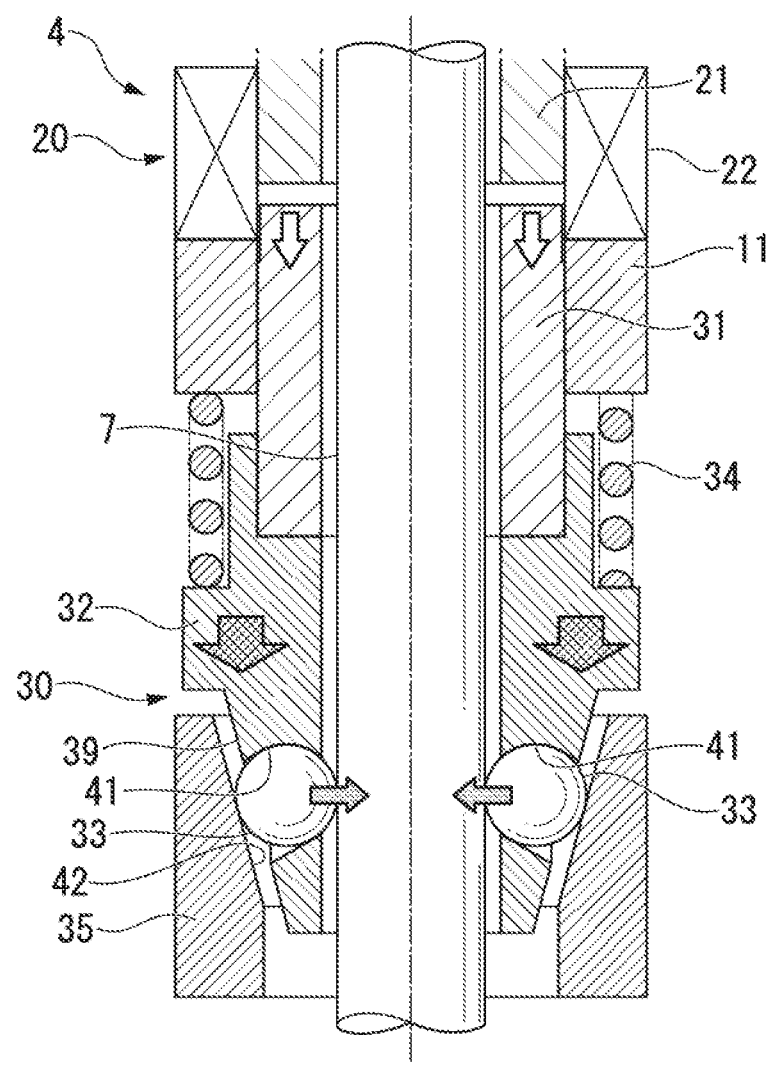
FIG. 5B is a second diagram for explaining the operation of the brake device according to the present embodiment.

FIGS. 5A and 5B are diagrams for explaining the operation of the brake device 4 in the present embodiment.

FIG. 5A shows a state in which the brake of the brake device 4 is off. When the brake is off, energization to the coil 22 is turned on. When the coil 22 is energized, the fixed core 21 of the drive unit 20 is magnetized to attract the movable core 31 of the brake mechanism 30 which faces the fixed core 21 in the axial direction of the rod 7. When the movable core 31 is attracted, the brake slider 32 integrated with the movable core 31 moves away from the ball guide 35.

When the brake slider 32 moves away from the ball guide 35, the balls 33 held by the brake slider 32 come into contact with a large diameter portion of the inclined surface 42 of the ball guide 35. That is, the gap between the outer peripheral surface of the rod 7 and the inclined surface 42 of the ball guide 35 at the holding position of the balls 33 becomes large such that the wedge against the rod 7 by the balls 33 is released. This allows the rod 7 to move in the axial direction.

FIG. 5B shows a state in which the brake of the brake device 4 is on. When the brake is on, energization to the coil 22 is turned off. When energization to the coil 22 is stopped, the fixed core 21 of the drive unit 20 is demagnetized. When the fixed core 21 is demagnetized, the biasing force of the compression spring 34 causes the brake slider 32 to move toward the ball guide 35.

When the brake slider 32 moves toward the ball guide 35, the balls 33 held by the brake slider 32 come into contact with a smaller diameter portion of the inclined surface 42 of the ball guide 35. That is, the gap between the outer peripheral surface of the rod 7 and the inclined surface 42 of the ball guide 35 at the holding position of the balls 33 becomes small such that the balls 33 are driven as a wedge into the gap between the rod 7 and the ball guide 35. This allows the rod 7 to be pressed in the radial direction such that the rod 7 cannot move in one axial direction (i.e., in the direction of gravity) due to the frictional force with the balls 33.

In this manner, according to the present embodiment, it is possible to generate a large brake force with the biasing force of the compression spring 34 by means of the taper angle of the inclined surface 42 of the ball guide 35, thus obtaining a small-sized and stable brake force. According to the brake mechanism 30 configured as described above, even when the brake is on, the rod 7 can easily move in the other axial direction (i.e., in the anti-gravity direction). That is, the anti-gravity direction of the rod 7 is a direction in which the wedge of the balls 33 loosens, and thus even when the brake is on, the rod 7 can move in the other axial direction.

Figure 6:
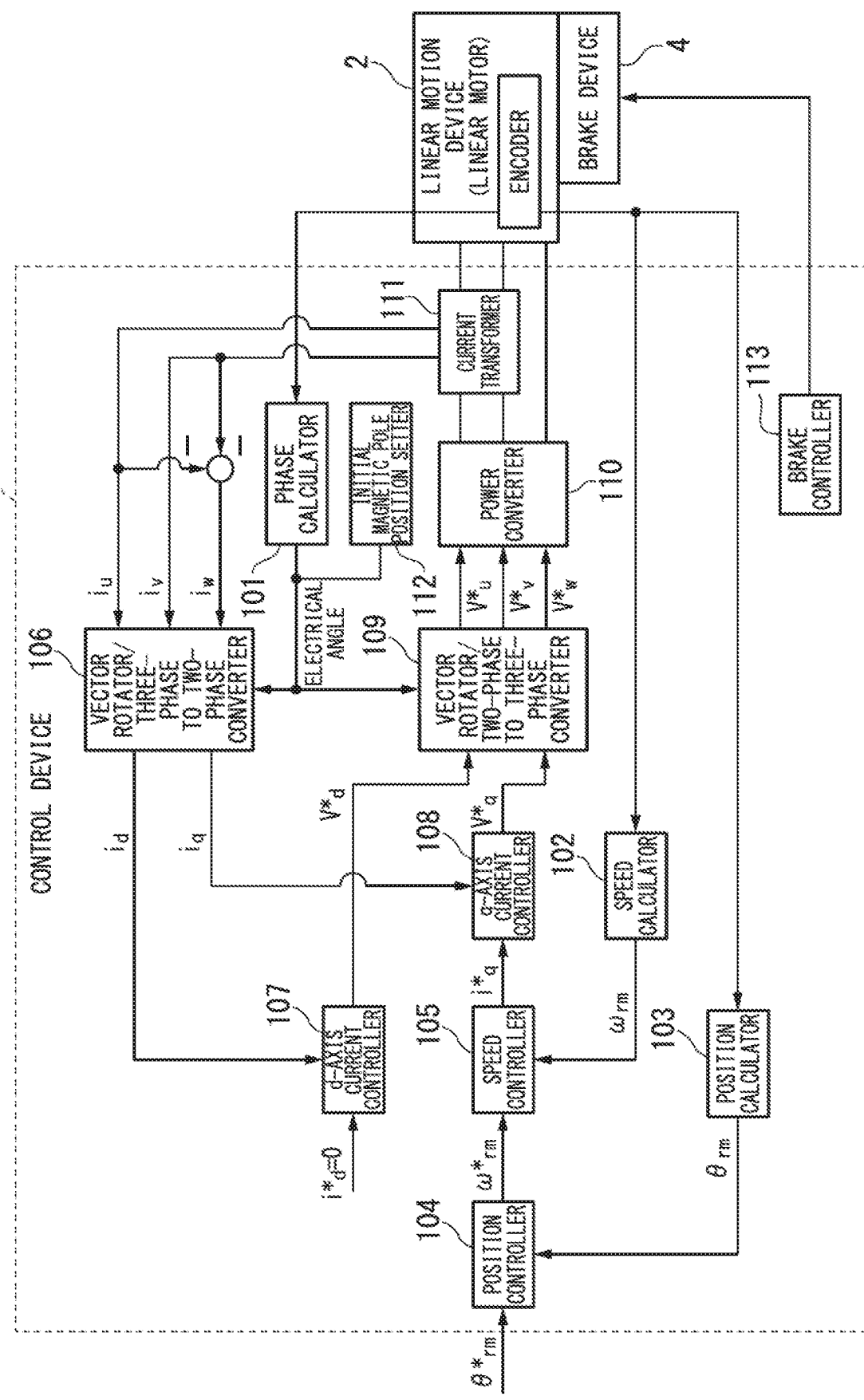
FIG. 6 is a block diagram showing a configuration of a control device that controls the linear actuator according to the present embodiment.

FIG. 6 is a block diagram showing a configuration of a control device 100 that controls the linear actuator 1 according to the present embodiment. The control device 100 controls the linear motor included in the linear motion device 2 and the brake device 4. The control device 100 generates a linearly moving field by supplying three-phase armature currents to U, V, and W phase coils provided in the linear motor included in the linear motion device 2 to move the mover of the linear motor linearly with respect to the stator.

In a moving coil type permanent magnet synchronous linear motor in which the field moves linearly, d-axis and q-axis armature currents are also controlled using the d-q coordinate system of rotational coordinates, similar to a rotating field type synchronous motor in which the field rotates. The transformation of the fixed part (stator) and the rotating part (mover) of the motor into a system of orthogonal coordinates which rotate together is d-q transformation, and its coordinate system is a d-q coordinate system. The phase of the q axis is $\pi/2$ ahead of that of the d axis. In the case of the permanent magnet synchronous motor, the d axis is generally taken in the direction of the magnetic flux produced by the magnetic field, and the d-q coordinates of the rotating field type permanent magnet synchronous motor are rotating coordinates.

FIG. 7 is a diagram showing an equivalent circuit of the permanent magnet synchronous motor in the d-q coordinate system. In the figure, $v_d$ is a d-axis armature voltage and $v_q$ is a q-axis armature voltage. $i_d$ is a d-axis armature current and $i_q$ is a q-axis armature current. $\phi_f$ is the number of armature winding flux linkages, R is an armature winding resistance, and L is the self inductance of the armature winding. When the q-axis a mature current is used, the thrust T of the permanent magnet synchronous motor is expressed by the following equation.

$$T = p\phi_f i_q$$

In the case of the permanent magnet synchronous motor, the thrust can be controlled by controlling the q-axis armature current $i_q$ since the number of armature winding flux linkages $\phi_f$ does not vary. Here, the d-axis armature current $i_d$ is generally controlled such that it is 0 from the viewpoint of motor efficiency. To control these currents $i_d$ and $L_q$ in this manner, it is necessary to control the d-axis armature voltage $v_d$ and the q-axis armature voltage $v_q$. It is also necessary to determine the positions of the d and q axes. At this time, if there is a deviation between the actual d-q coordinates of the linear motor and d$\hat{0}$-q$\hat{0}$ coordinates determined by the control device 100, an error occurs in control of the linear motor, and therefore it is necessary to acquire the d$\hat{0}$-q$\hat{0}$ coordinates with high accuracy.

Returning to FIG. 6, the configuration of the control device 100 will be described. The control device 100 includes a phase calculator 101, a speed calculator 102, a position calculator 103, a position controller 104, a speed controller 105, a vector rotator/three-phase to two-phase converter 106, a d-axis current controller 107, a q-axis current controller 108, a vector rotator/two-phase to three-phase converter 109, a power converter 110, a current transformer 111, an initial magnetic pole position setter 112, and a brake controller 113.

The amount of movement of the mover of the linear motor is input to the phase calculator 101 from an encoder attached to the linear motor. When the initial magnetic pole position has been set, the phase calculator 101 calculates a magnetic pole position $\theta_{re}$ (d-axis position, electrical angle) of the linear motor on the basis of the initial magnetic pole position and the amount of movement input from the encoder. The phase calculator 101 outputs the calculated magnetic pole position to the vector rotator/three-phase to two-phase converter 106 and the vector rotator/two-phase to three-phase converter 109.

The amount of movement of the mover of the linear motor is input to the speed calculator 102 from the encoder. The speed calculator 102 calculates the movement speed of the mover on the basis of the amount of movement of the mover input after the initial magnetic pole position is set. The speed calculator 102 outputs the calculated movement speed $\omega_{rm}$ to the speed controller 105.

The amount of movement of the mover of the linear motor is input the position calculator 103 from the encoder.

The position calculator 103 calculates the position of the mover on the basis of the amount of movement of the mover input after the initial magnetic pole position is set. The position calculator 103 outputs the calculated position $\theta_{rm}$ of the mover to the position controller 107.

A position command value $\theta^*_{rm}$ is input to the position controller 104 from a higher level control device (not shown) and the position $\theta_{rm}$ of the mover is input thereto from the position calculator 103. The position controller 104 calculates a speed command value $\omega^*_{rm}$ on the basis of a deviation between the input position command value $\theta^*_{rm}$ and the input position $\theta_{rm}$. The position controller 104 outputs the calculated speed command value $\omega^*_{rm}$ to the speed controller 105.

The speed command value $\omega^*_{rm}$ is input to the speed controller 105 from the position controller 104 and the movement speed $\omega_{rm}$ is input thereto from the speed calculator 102. The speed controller 105 calculates a q-axis current command value $i^*_q$ on the basis of a deviation between the input speed command value $\omega^*_{rm}$ and the input movement speed $\omega_{rm}$. The speed controller 105 outputs the calculated q-axis current command value $i^*_q$ to the q-axis current controller 108.

Three-phase feedback current values $i_B$ and $i_v$ are input to the vector rotator/three-phase to two-phase converter 106 from the current transformer 111 and a three-phase feedback current value $i_w$ calculated from the three-phase feedback current values $i_u$ and $i_v$ is also input thereto. In addition, the electrical angle (magnetic pole position) $\theta_{re}$ calculated by the phase calculator 101 is input to the vector rotator/three-phase to two-phase converter 106. The vector rotator/three-phase to two-phase converter 106 calculates the d-axis current $i_d$ and the q-axis current $r_q$ from the three-phase feedback current values $i_u$, $i_v$, and $i_w$ on the basis of the electrical angle $\theta_{re}$. The vector rotator/three-phase to two-phase converter 106 outputs the calculated d-axis current $i_d$ to the d-axis current controller 107. The vector rotator/three-phase to two-phase converter 106 outputs the calculated q-axis current $i_q$ to the q-axis current controller 108.

The d-axis current controller 107 calculates a d-axis voltage command value $V^*_d$ on the basis of a deviation between the d-axis current $i_d$ output from the vector rotator/three-phase to two-phase converter 106 and the d-axis current command $i^*_d$. The d-axis current controller 107 outputs the calculated d-axis voltage command value $V^*_d$ to the vector rotator/two-phase to three-phase converter 109. 0 is set for the d-axis current command $i^*_d$.

The q-axis current controller 108 calculates a q-axis voltage command value $V^*_q$ on the basis of a deviation between the q-axis current $i_q$ output from the vector rotator/three-phase to two-phase converter 106 and the q-axis current command value $i^*_q$ output from the speed controller 105. The q-axis current controller 108 outputs the calculated q-axis voltage command value $V^*_q$ to the vector rotator/two-phase to three-phase converter 109.

To the vector rotator/two-phase to three-phase converter 109, the d-axis voltage command value $V^*_d$ is input from the d-axis current controller 107, the q-axis voltage command value $V^*_q$ is input from the q-axis current controller 108, and the electrical angle $\theta_{re}$ is input from the phase calculator 101. On the basis of the electrical angle $\theta_{re}$, the vector rotator/two-phase to three-phase converter 109 calculates three-phase voltage command values $V^*_u$, $V^*_v$, and $V^*_w$ from the d-axis voltage command value $V^*_d$ and the q-axis voltage command value $V^*_q$. The vector rotator/two-phase to three-phase converter 109 outputs the calculated three-phase voltage command values $V^*_u$, $V^*_v$, and $V^*_w$ to the power converter 110.

On the basis of the three-phase voltage command values $V^*_u$, $V^*_v$, and $V^*_w$ output from the vector rotator/two-phase to three-phase converter 109, the power converter 110 converts the voltage of a power supply voltage supplied from an external power supply and applies the voltage to the U, V, and W phase coils of the linear motor. By causing currents based on the three-phase voltage command values $V^*_u$, $V^*_v$, and $V^*_w$ to flow through the coils of the phases of the linear motor, the control device 100 generates a moving field to perform control for moving the rod 5, which is the mover, in the axial direction.

The current transformer 111 measures currents flowing through the U-phase and V-phase coils of the linear motor and outputs the measurement result as three-phase feedback current values $i_u$ and $i_v$ to the vector rotator/three-phase to two-phase converter 106. A three-phase feedback current value $i_w$ calculated from the three-phase feedback current values $i_u$ and $i_v$ is also output to the vector rotator/three-phase to two-phase converter 106.

The initial magnetic pole position setter 112 sets the q$\hat{0}$-axis current to 0 and the d$\hat{0}$-axis current to $i_d$ to generate a thrust to operate the linear motor. On the basis of the movement direction and the amount of movement of the mover of the linear motor obtained via the encoder, the initial magnetic pole position setter 112 detects the magnetic pole position of the linear motor to set the initial magnetic pole position. During setting of the initial magnetic pole position, the position controller 104 and the speed controller 105 do not operate.

The brake controller 113 switches on/off the brake device 4 to decide whether or not to perform braking on the rod 7 connected to the rod 5 which is the mover of the linear motor.

By stopping energization to the coil 22, the brake controller 113 turns on the brake device 4 to perform braking on the rods 5 and 7. By energizing the coil 22, the brake controller 113 turns off the brake device 4 to release braking of the rods 5 and 7.

Figure 8:
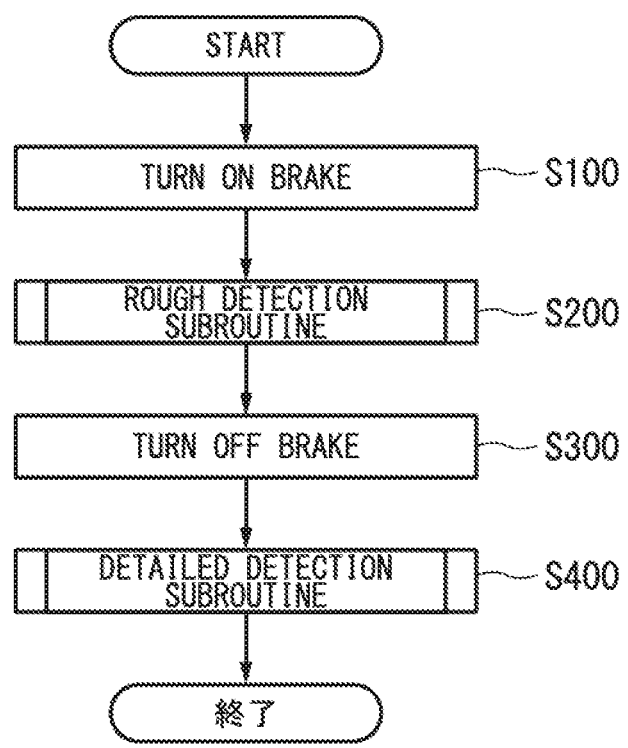
FIG. 8 is a flowchart shoving a procedure for setting an initial magnetic pole position performed by the control device of the present embodiment.

A procedure for setting the initial magnetic pole position by the control device. 100 of the present embodiment will now be described. FIG. 8 is a flowchart showing the procedure for setting the initial magnetic pole position performed by the control device 100 in the present embodiment. This procedure is performed when the linear actuator 1 is disposed such that the axial direction of the mover (the rod 5) of the linear motor included in the linear motion device 2 is the vertical direction and the magnetic pole position (the electrical angle) decreases when the mover moves in the direction of gravity and increases when the mover moves in the anti-gravity direction.

In the control device 100, when setting of the initial magnetic pole position starts as power supply starts or as an instruction is received from the higher level control device, the brake controller 113 turns on the brake device 4 (step S100). The initial magnetic pole position setter 112 operates as a magnetic pole position estimation means and executes a rough detection subroutine (step S200). In the rough detection subroutine, the initial magnetic pole position setter 112 estimates which of a plurality of sections obtained by dividing the d$\hat{0}$-axis magnetic pole position of 0° to 360° the rod 5 is located in on the basis of the direction of movement of the rod 5 by pulse energization and narrows down the d$\hat{0}$-axis magnetic pole position (electrical angle $\theta_{re}$, estimated magnetic pole position) obtained by estimating the magnetic pole position of the rod 5 by performing pulse energization according to the estimated section. Upon completion of the rough detection subroutine, the brake controller 113 turns off the brake device 4 (step S300). The initial magnetic pole position setter 112 operates as a magnetic pole position setting means and executes a detailed detection subroutine (step S400), and terminates setting of the initial magnetic pole position when the magnetic pole position of the rod 5 has been set. It is to be noted that the brake device 4 may be turned on even in a state in which no power is supplied to the control device 100.

Figure 9:
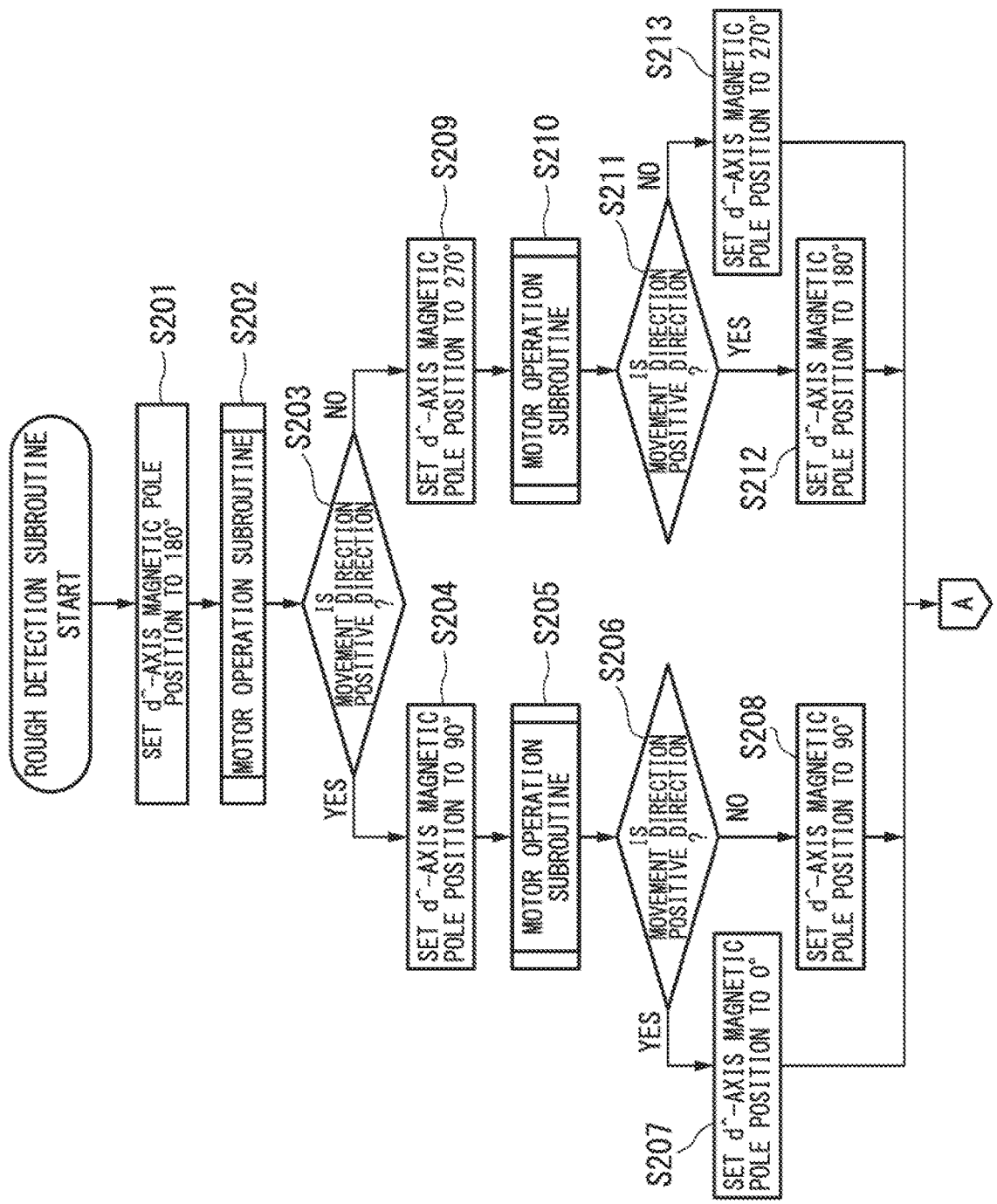
FIG. 9 is a first flowchart showing a rough detection subroutine performed by the e control device in the present embodiment.
Figure 10:
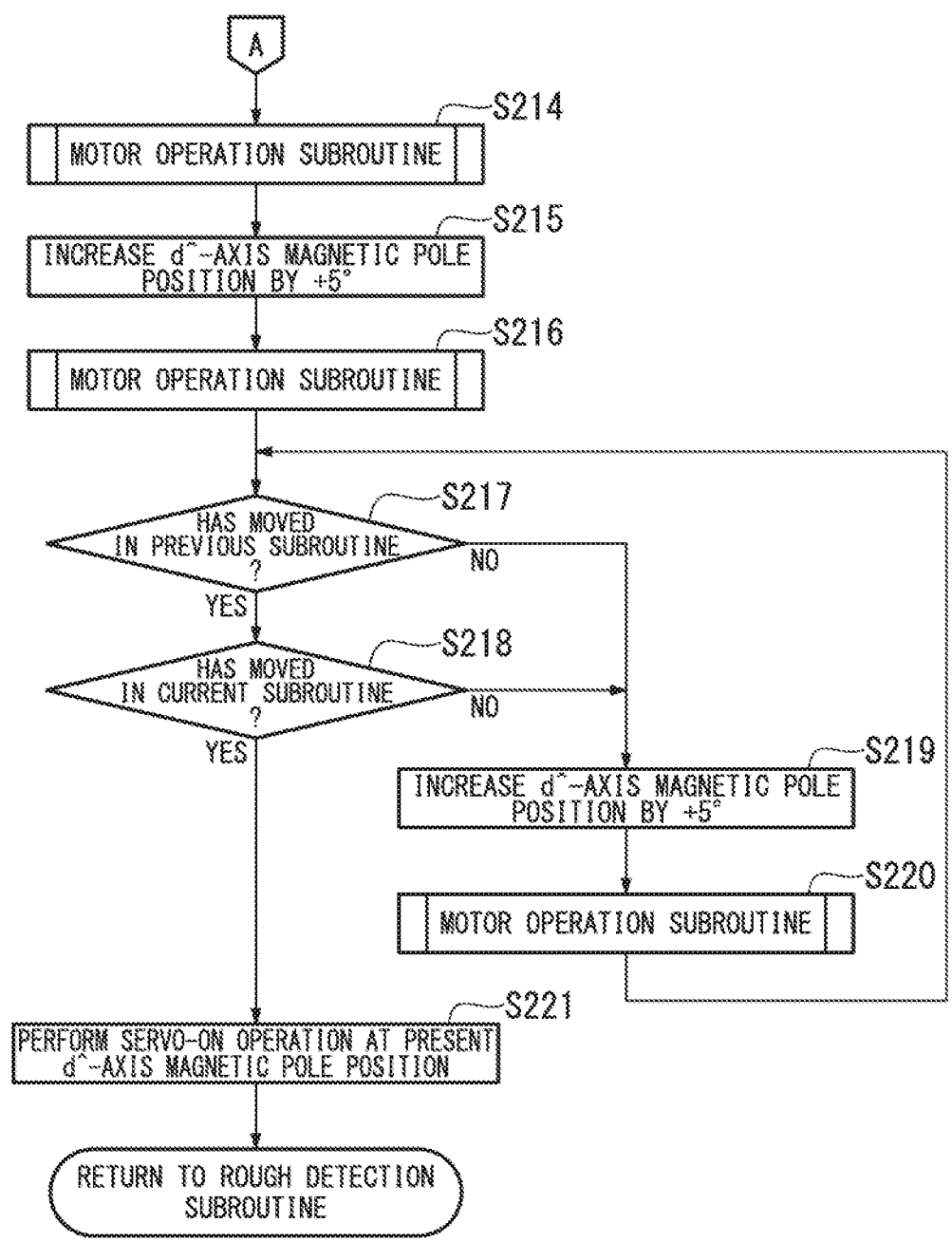
FIG. 10 is a second flowchart showing the rough detection subroutine performed by the control device in the present embodiment.

FIGS. 9 and 10 are flowcharts showing the rough detection subroutine performed by the control device 100 in the present embodiment. When the rough detection subroutine starts, the initial magnetic pole position setter 112 sets the d0̂-axis magnetic pole position to 180° (step S201) and executes a motor operation subroutine (step S202).

When setting the d0̂-axis magnetic pole position, the initial magnetic pole position setter 112 sets a current value of 1/n times the rated current as an initial value of the energizing current value which is an initial value of a current flowing in the motor operation subroutine. For example, n is 8 and the initial value of the energizing current value is set to a current value of ⅛ times the rated current. Moreover, n is predetermined on the basis of, for example, a period of time until the mover starts moving due to the thrust generated by the linear motor.

Figure 12:
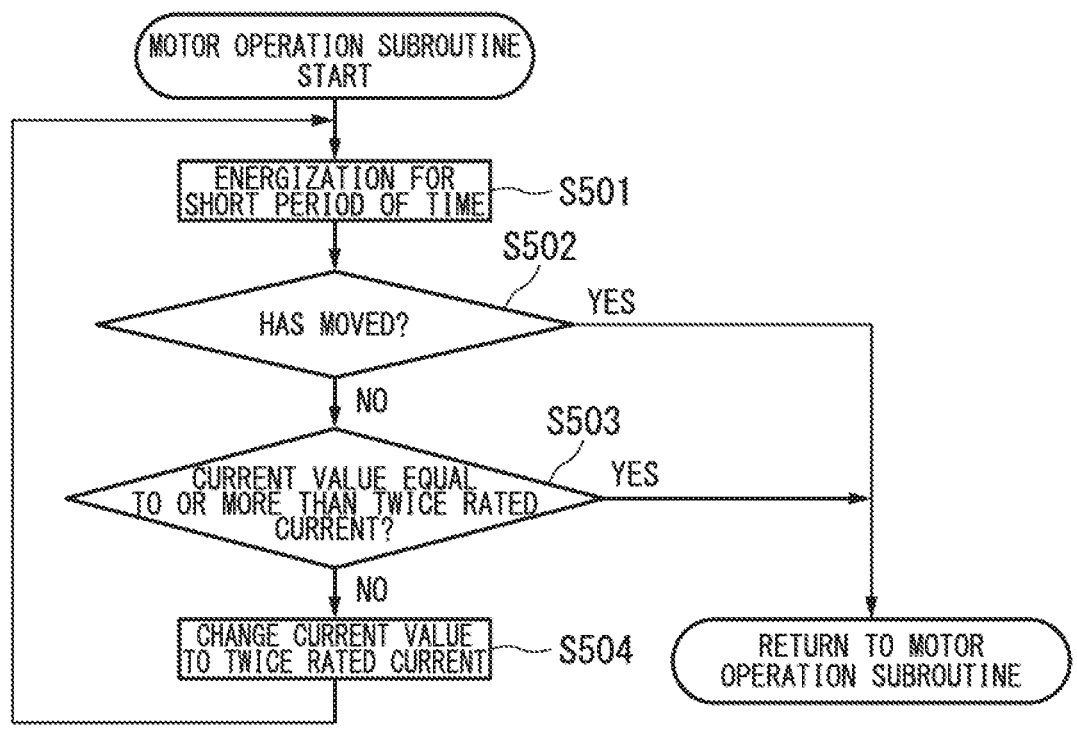
FIG. 12 is a flowchart showing a motor operation subroutine performed by the control device in the present embodiment.

Here, the procedure of the motor operation subroutine will be described. FIG. 12 is a flowchart showing the motor operation subroutine performed by the control device 100 in the present embodiment. When the motor operation subroutine starts, the initial magnetic pole position setter 112 controls the vector rotator/two-phase to three-phase converter 109 to apply U, V and W phase voltages corresponding to the d0̂-axis magnetic pole position, respectively, to the U, V, and W phase coils of the linear motor for a predetermined short period of time to apply pulse energization to the linear motor (step S501). The short period of time is set to the minimum time from when a current is allowed to flow through each coil to when a current actually flows through each coil to generate a thrust. The short period of time is set to, for example, 10 milliseconds.

The initial magnetic pole position setter 112 determines whether or not the mover has moved due to the energization of step S501 on the basis of the amount of movement of the mover detected by the encoder (step S502). When the mover has moved (step S502: YES), the initial magnetic pole position setter 112 terminates the motor operation subroutine and returns the procedure to the step subsequent to the step of calling (executing) the motor operation subroutine.

When the mover has not moved due to the energization of step S501 (step S502: NO) the initial magnetic pole position setter 112 determines whether or not the present energizing current value is equal to or more than twice the rated current (step S503). When the energizing current value is equal to or more than twice the rated current (step S503: YES) the initial magnetic pole position setter 112 terminates the motor operation subroutine and returns the procedure to the step subsequent to the step of calling (executing) the motor operation subroutine.

When the present energizing current value is not equal to or more than twice the rated current (step S503: NO), the initial magnetic pole position setter 112 changes the energizing current value to twice the present energizing current value (step S504), returns the procedure to step S501, and repeats the processes of steps S501 to S504. In the motor operation subroutine, the U, V and W phase voltages corresponding to the set d0̂-axis magnetic pole position are respectively applied to the U, V and W phase coils, and energization is performed with 1/n times the rated current, 2/n times the rated current, . . . , twice the rated current in order until the mover moves.

Returning to FIG. 9, the description of the procedure for setting the initial magnetic pole position will be continued. The initial magnetic pole position setter 112 determines whether or not the direction in which the mover (the rod 5) of the linear motor has operated in the motor operation subroutine (step S202) is a predetermined direction (positive direction) (step S203). It is to be noted that the predetermined direction is, for example, a direction in which the magnetic pole position (the electrical angle) increases.

If the determination of step S203 is that the direction in which the rod 5 has operated is a positive direction (step S203: YES), the initial magnetic pole position setter 112 sets the d0̂-axis magnetic pole position to 90° and sets the energizing current value to 1/n times the rated current (step S204). The initial magnetic pole position setter 112 executes a motor operation subroutine (step S205). The motor operation subroutine executed in step S205 and a motor operation subroutine which will be described below are the same as the motor operation subroutine shown in FIG. 12. The initial magnetic pole position setter 112 determines whether or not the direction in which the rod 5 has operated in the motor operation subroutine (step S205) is the positive direction (step S206).

If the determination of step S206 is that the direction in which the rod 5 has operated is the positive direction (step S206: YES), the initial magnetic pole position setter 112 sets the d0̂-axis magnetic pole position to 0° and sets the energizing current value to times the rated current (step S207), and then advances the procedure to step S214 (FIG. 10).

On the other hand, if the determination of step S206 is that the direction in which the rod 5 has operated is not the positive direction (step S206: NO), the initial magnetic pole position, setter 112 sets the d0̂-axis magnetic pole position to 90° and sets the energizing current value to 1/n times the rated current (step S208), and then advances the procedure to step S214 (FIG. 10).

If the determination of step S203 is that the direction in which the rod 5 has operated is not the positive direction (step S203: NO), the initial magnetic pole position setter 112 sets the d0̂-axis magnetic pole position to 270° and sets the energizing current value to 1/n times the rated current (step S209). The initial magnetic pole position setter 112 executes a motor operation subroutine (step S210). The initial magnetic pole position setter 112 determines whether or not the direction in which the rod 5 has operated in the motor operation subroutine (step S210) is the positive direction (step S211).

When the determination of step S211 is that the direction in which the rod 5 has operated is the positive direction (step S211: YES), the initial magnetic pole position setter 112 sets the d0̂-axis magnetic pole position to 180° and sets the energizing current value to 1/n times the rated current (step S212), and then advances the procedure to step S214 (FIG. 10).

On the other hand, when the determination of step S211 is that the direction in which the rod 5 has operated is not the positive direction (step S211: NO), the initial magnetic pole position setter 112 sets the d0̂-axis magnetic pole position to 270° and sets the energizing current value to times the rated current (step S213), and then advances the procedure to step S214 (FIG. 10).

The initial magnetic pole position setter 112 executes the motor operation subroutine (step S214). Subsequently, the initial magnetic pole position setter 112 increases the d0̂-axis magnetic pole position by ±5° (by a first amount of change) and sets the energizing current value to 1/n times the rated current (step S215), and then executes a motor operation subroutine (step S216).

The initial magnetic pole position setter 112 determines whether or not the rod 5 has moved in the previous motor operation subroutine (step S217). When the rod 5 has not moved (step S217: NO), the initial magnetic pole position setter 112 increases the d$\hat{0}$-axis magnetic pole position by ±5 and sets the energizing current value to 1/n times the rated current (step S219) and executes the motor operation subroutine (step S220), and then returns the procedure to step S217.

If the determination of step S217 is that the rod 5 has moved (step S217: YES) the initial magnetic pole position setter 112 determines whether or not the rod 5 has moved in the current motor operation subroutine (step S218), and if the rod 5 has not moved (step S218: NO), the initial magnetic pole position setter 112 advances the procedure to step S219. That is, the initial magnetic pole position setter 112 repeats the processes of steps S217 to S220 until the rod 5 moves in each of the respective pulse energization of two consecutive motor operation subroutines.

If the determination of step S218 is that the rod 5 has moved (step S218: YES), the initial magnetic pole position setter 112 performs a servo-on operation to start position control on the basis of the present d$\hat{0}$-axis magnetic pole position (step S221), terminates the rough detection subroutine, and returns to step S300 which is subsequent to the step S200 of calling (executing) the rough detection subroutine.

Figure 11:
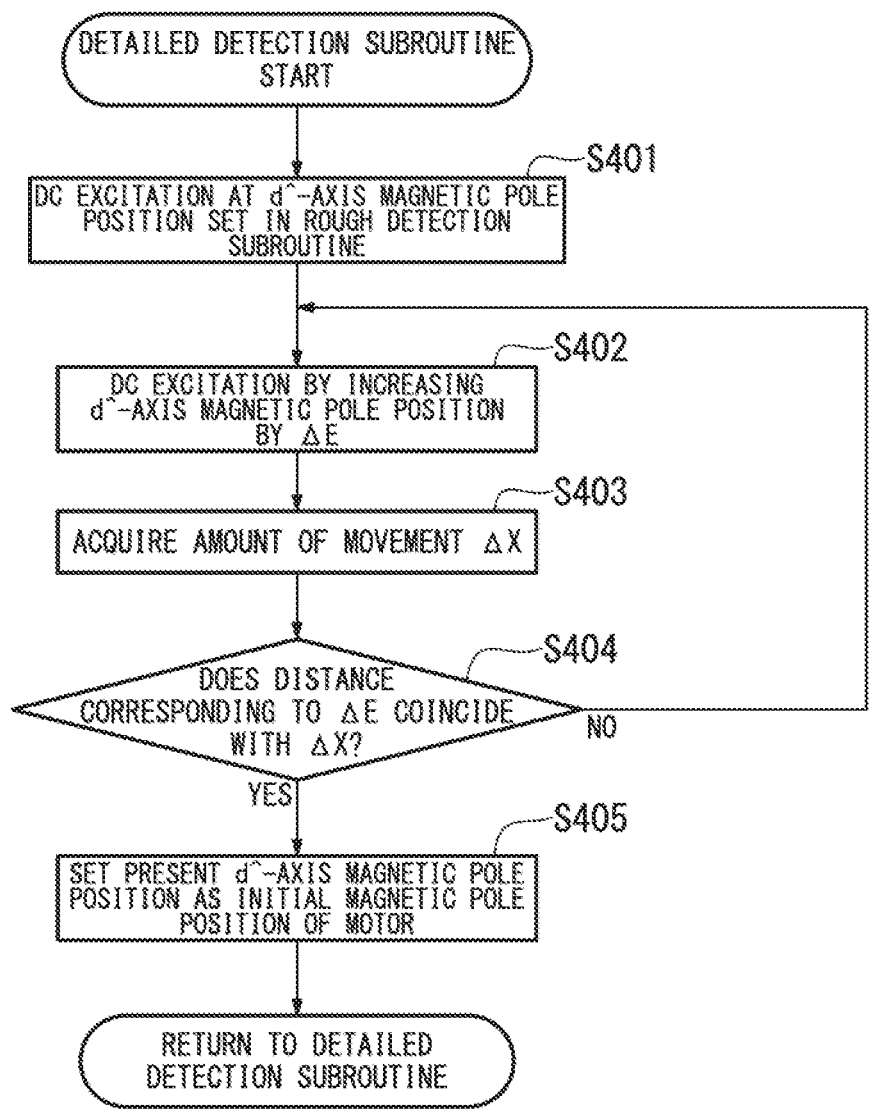
FIG. 11 is a flowchart showing a detailed detection subroutine performed by the control device in the present embodiment.

FIG. 11 is a flowchart showing a detailed detection subroutine performed by the control device 100 in the present embodiment. When the detailed detection subroutine starts, the initial magnetic pole position setter 112 performs DC excitation at the d$\hat{0}$-axis magnetic pole position set in the rough detection subroutine (step S401). At this time, the initial magnetic pole position setter 112 temporarily interrupts position control until the rough detection subroutine is terminated. The initial magnetic pole position setter 112 performs DC excitation by increasing the d$\hat{0}$-axis magnetic pole position of DC excitation by $\Delta E$ (a second amount of change) (step S402) and acquires the amount of movement $\Delta X$ by which the rod 5 has grooved when the d$\hat{0}$-axis magnetic pole position has changed via the position calculator 103 (step S403). Here, the amount of change $\Delta E$ of the magnetic pole position is a predetermined amount of change, which is determined according to the detection resolution of the encoder, the control resolution of the control device 100, or the like. For example, a value such as 1° or 2°, which is smaller than 5° (the first amount of change) in step S215, is used as the amount of change $\Delta E$.

The initial magnetic pole position setter 112 determines whether or not the amount of movement $\Delta X$ acquired in step S403 coincides with a distance corresponding to the amount of change $\Delta E$ (step S404). Here, the distance corresponding to the amount of change $\Delta E$ is the distance that the rod 5 is to move when the d$\hat{0}$-axis magnetic pole position E is changed to (E±$\Delta E$) when DC excitation is performed.

If the amount of movement $\Delta X$ does not coincide with the distance corresponding to the amount of change $\Delta E$ (step S404: NO), the initial magnetic pole position setter 112 returns the procedure to, step S402 and repeats the processes of steps S402 to S404. On the other hand, if the amount of movement $\Delta X$ coincides with the distance corresponding to the amount of change $\Delta E$ (step S404: YES), the initial magnetic pole position setter 112 assumes that the rod 5 is located at the present d$\hat{0}$-axis magnetic pole position and sets the present d$\hat{0}$-axis magnetic pole position as the initial magnetic pole position of the linear motor (step S405), terminates the detailed detection subroutine, and returns the procedure to the step subsequent to step S400 of call (executing) the detailed detection subroutine.

As described above, the control device 100 performs rough detection to specify the magnetic pole position of the mover with coarse precision by a plurality of pulse energization in a state in which the brake device 4 is turned on and then performs detailed detection by DC excitation based on the specified magnetic pole position in a state in which the brake device 4 is turned off. Specifically, when the rod 5 has moved in each of the two consecutive pulse energization, the control device 100 completes the specification with coarse precision by narrowing the estimated magnetic pole position down to the vicinity of the magnetic pole position of the mover and performs DC excitation at the specified estimated magnetic pole position. Since the brake device 4 is turned on in the period during which pulse energization is performed twice, it is possible to prevent the mover from moving due to gravity between pulse energization and pulse energization and it is possible to narrow down the magnetic pole position of the mover on the basis of the movement in the anti-gravity direction. Even when the brake device 4 is in an on state, the brake device 4 does not prevent the mover from moving in the anti-gravity direction and therefore the mover can operate in the anti-gravity direction by pulse energization. Even when the brake device 4 is in an on state, the mover can also move while receiving resistance in the anti-gravity direction.

The control device 100 coarsely specifies the magnetic pole position of the mover by a plurality of pulse energization and then pulls the mover by DC excitation at the specified coarse magnetic pole position to prevent the mover from moving due to an external force while changing the magnetic pole position of the DC excitation. The control device 100 determines whether or not the amount of movement of the mover when the magnetic pole position of the DC excitation has changed corresponds to the amount of change of the magnetic pole position to determine whether or not the mover has been pulled to the magnetic pole position. After narrowing down the magnetic pole position with coarse precision in this manner, it is possible to improve the accuracy of detection of the magnetic pole position by specifying the magnetic pole position of the mover with the magnetic pole position of DC excitation being shifted by a small amount $\Delta E$. In addition, since the brake device 4 is turned off when the DC excitation starts, the control device 100 can allow the mover to move without being braked by the brake device 4 and thus improve the accuracy of detection of the magnetic pole position of the mover. Further, use of the control device 100 can eliminate the need to provide a magnetic pole sensor in the linear motor of the linear motion device 2 and can reduce the size of the linear motion device 2.

The embodiment according to the present invention has been described with reference to the drawings, but the present invention is not limited to the above embodiment. The shapes, combinations, or the like of the constituent members shown in the above embodiment are examples and various modifications can be made on the basis of design requirements or the like without departing from the gist of the present invention.

For example, the above embodiment has been described with regard to the case in which the brake device 4 is configured such that, when it is in an on state, it does not allow the mover to move in the direction of gravity and allows the mover to move in the anti-gravity direction. However, if the brake device can apply braking to such an extent that the mover does not move due to the action of gravity, the mover may be able to move in both the gravity direction and the anti-gravity direction by the thrust of the linear motor. In this case, even when the brake device is in an on state, the mover can move while receiving resistance in the anti-gravity direction.

Further, the above embodiment has been described with regard to the case in which the direction of movement of the mover of the linear motion device 2 is the vertical direction and the external force acting on the mover (the rod 5) is gravity. However, the control device 100 can also be applied to the case in which an external force other than gravity is applied to the rod 5 or the rod 7.

Furthermore, the above embodiment has been described with regard to the configuration wherein which of the four sections divided at intervals of 90°, i.e., the section of 0° to 90°, the section of 90° to 180°, the section of 180° to 270°, and the section of 270° to 360°(0°), the magnetic pole position of the mover is located in is estimated in the procedure for setting the initial magnetic pole position. However, for example, which of sections at intervals of 30° or 45° instead of the sections at intervals of 90° the magnetic pole position of the mover is located in may also be estimated.

Moreover, ±5° in steps S215 and S219 and 1° or 2° in step S401 in the procedure for setting the initial magnetic pole position in the above embodiment are examples and may be other angles (amounts of change). Further, the above embodiment has been described with regard to the case in which the anti-gravity direction is the positive direction of the magnetic pole position, but the anti-gravity direction may be the negative direction of the magnetic pole position. In this case, each value set for the d$\hat{0}$-axis magnetic pole position in steps S207, S208, S212 and S213 is the maximum value instead of the minimum value in the corresponding section. In addition, the first amount of change in steps S215 and S219 is −5° instead of +5° and the amount of change ΔE step S401 is a decrease instead of an increase.

The procedure for setting the initial magnetic pole position in the above embodiment has been described with regard to the configuration wherein the brake device 4 is turned off before the detailed detection subroutine starts. However, the brake device 4 may be turned off in parallel with the procedure of the detailed detection subroutine. For example, the DC excitation of step S401 in the detailed detection subroutine may be performed before the brake device 4 is turned off or the processes of steps S402 to S404 may be performed before the brake device 4 is turned off. The brake device 4 may also be turned off after the detailed detection subroutine is terminated. That is, the DC excitation may be performed before the brake device 4 is turned off.

Further, in the rough detection subroutine of the above embodiment, the processes of narrowing down the d$\hat{0}$-axis magnetic pole position in steps S214 to S220 may be omitted and a servo-on operation may be performed (in step S221) on the basis of the d$\hat{0}$-axis magnetic pole position set in step S207, S208, S212 or S213.

The control device 100 in the above embodiment may have, a computer system therein. In this case, the above procedure for setting the initial magnetic pole position is stored in a computer readable recording medium in the form of a program and the procedure is performed by the computer reading and executing the program. Here, the computer readable recording medium means a magnetic disk, a magneto-optical disk, a CD-ROM, a DVD-ROM, a semiconductor memory, or the like. Further, the computer program may be delivered to a computer through a communication line and the computer which has received the program may execute the program.

INDUSTRIAL APPLICABILITY

The present invention can be applied to applications where it is necessary to improve the accuracy of detection of the magnetic pole position in the linear motor.

REFERENCE SIGNS LIST

2 Linear motion device (linear motor)
4 Brake device
100 Control device

The invention claimed is:

1. A control device for a linear actuator having a linear motor and a mechanical brake device configured to brake a mover of the linear motor, the control device comprising:
an initial magnetic pole position setter during a rough detection subroutine that is configured to estimate which of a plurality of sections obtained by dividing a magnetic pole position of 0° to 360° the mover is located in on the basis of a direction of movement of the mover by pulse energization;
a brake controller that is configured to turn on the mechanical brake device before pulse energization by the initial magnetic pole position setter during the rough detection subroutine is performed and turn off the mechanical brake device after the initial magnetic pole position setter during the rough detection subroutine estimates the section in which the mover is located; and
an initial magnetic pole position setter during a detailed detection subroutine that is configured to, after the mechanical brake device is turned off, perform direct current excitation at an estimated magnetic pole position based on the section in which the mover is located estimated by the initial magnetic pole position setter during the rough detection subroutine and set the estimated magnetic pole position as a magnetic pole position of the mover.

2. The control device according to claim 1, wherein the initial magnetic pole position setter during the rough detection subroutine is configured to estimate the section in which the mover is located on the basis of a direction in which the mover has moved in each of first and second consecutive pulse energization, and start position control of the linear motor corresponding to a position of the estimated section.

3. The control device according to claim 2, wherein, when the mechanical brake device is in an on state, the mechanical brake device is configured to brake a movement of the mover in a first direction in which the mover is movable and to not brake a movement thereof in a second direction opposite to the first direction, and
the mover is configured to receive an external force in the first direction.

4. The control device according to claim 2, wherein the mover is configured to receive an external force in one of a first direction in which the mover is movable and a second direction opposite to the first direction, and
the mechanical brake device is configured to apply braking to such an extent that the mover is not moved by the external force when the mechanical brake device is in an on state.

5. A control method for a control device to control a linear actuator having a linear motor and a mechanical brake device configured to brake a mover of the linear motor, the control method comprising:
a first step including turning on the mechanical brake device;

a second step including estimating which of a plurality of sections obtained by dividing a magnetic pole position of 0° to 360° the mover is located in on the basis of a direction of movement of the mover by pulse energization;
a third step including turning off the mechanical brake device after the section in which the mover is located is estimated in the second step; and
a fourth step including, after the mechanical brake device is turned off, performing direct current excitation at an estimated magnetic pole position based on the section in which the mover is located estimated in the second step and setting the estimated magnetic pole position as a magnetic pole position of the mover.

* * * * *